P. DENNIS.

Shovel-Plow.

No. 1,515. Reissued Aug. 4, 1863.

N. PETERS, PHOTO-LITHOGRAPHER, WASHINGTON, D. C.

UNITED STATES PATENT OFFICE.

PAUL DENNIS, OF BEMUS HEIGHTS, NEW YORK.

IMPROVEMENT IN CULTIVATORS.

Specification forming part of Letters Patent No. 19,412, dated February 23, 1858; Reissue No. 1,515, dated August 4, 1863.

*To all whom it may concern:*

Be it known that I, PAUL DENNIS, of Bemus Heights, in the county of Saratoga and State of New York, have invented a new and Improved Shovel-Plow; and I do hereby declare that the following is a full, clear, and exact description of the same, reference being had to the accompanying drawings, making a part of this specification, in which—

Figure 1:
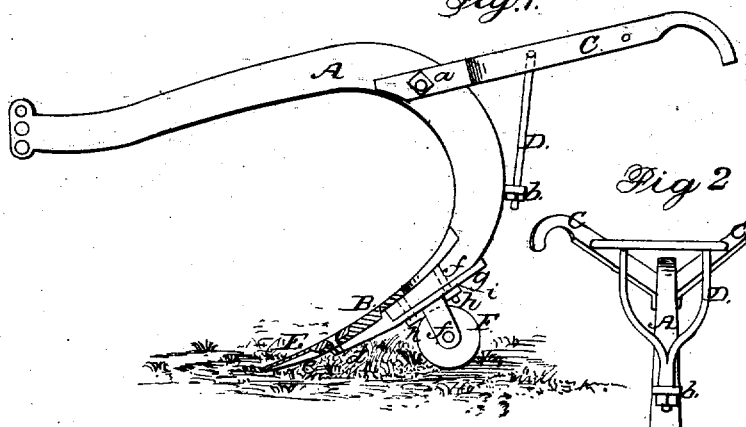
Figure 2:
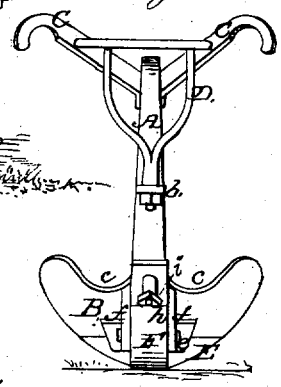
Figure 3:
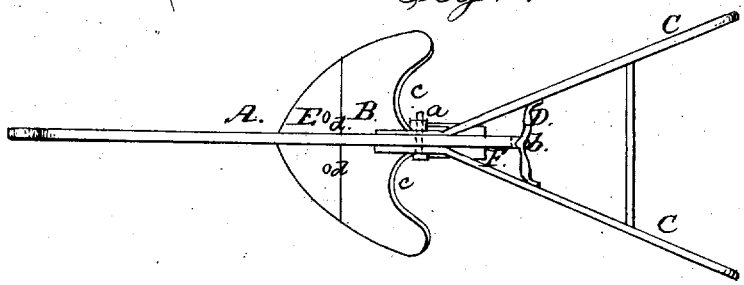

Figure 1 is a side view of my invention; Fig. 2, a back view of the same; Fig. 3, a plan or top view of the same.

Similar letters of reference indicate corresponding parts in the several figures.

This invention consists in a peculiar manner of constructing or forming the upper edge of the mold-board with recesses, so that the earth, as the implement is drawn along, will pass over the top of the mold-board and drop into the furrow behind it and partially or wholly fill the same, thereby leaving the earth in a level and also in a loose, light, or friable state, permeable to air and moisture, and at the same time preventing earth, sods, stones, &c., being cast against the growing plants by the mold-board—a contingency of frequent occurrence in using the ordinary plows.

The invention further consists in the employment or use of a gage applied to the implement in such a manner as to admit of the mold-board penetrating the soil at a greater or less distance, as may be desired.

To enable those skilled in the art to fully understand and construct my invention, I will proceed to describe it.

A represents a metallic bar, which is curved so that the front part will form the beam of the implement and the back part an inclined portion, to which the mold-board B is firmly attached. The form of the bar A is clearly shown in Fig. 1.

To the bar A, near the center of its curve or bend, the lower ends of handles C C are attached by a bolt, as shown at *a*. These handles are braced by a V-shaped support, D, the lower end of which is secured to the bar A, as shown at *b*.

The mold-board B is of shovel form, and is much like those usually made, with the exception that its upper edge or part is scalloped out so as to form a recess, *c*, at each side of the bar A, as shown clearly in Figs. 2 and 3, said recesses extending down nearly or about one-half the length of the mold-board. The mold-board may be constructed of malleable cast-iron.

E is the point or share, which is constructed of steel, the lower end being pointed and its sides slightly rounded or curved, so that the form of the mold-board and point or share, when connected together, will closely approximate to those which are cast in one piece, the recesses *c* being excepted. The point or share E may be attached to the mold-board B by bolts *d*, which are attached to the point or share and pass through a projecting plate, *e*, at the under side of the mold-board. (See Figs. 1 and 2.)

F is an adjustable metallic roller, which is attached to the bar A just back of the mold-board B. The axis of the roller F is fitted or has its bearings in arms *f f*, which project obliquely from a plate, *g*, said plate being slotted longitudinally, so that the bolts *h h*, which secure the mold-board to the bar, may pass through said slot, the bolts *h* having each a nut, *i*, on them, by screwing up which the plate *g*, and consequently the roller F, may be secured higher or lower, as desired.

From the above description it will be seen that the point or share E and mold-board B may be made to penetrate the soil at a greater or less depth, as may be desired, by adjusting the roller E and draft-chain, said roller serving as a gage or guide, and the draft-chain being adjusted at the end of the beam, so that the draft may aid the roller and the point or share be made to have a tendency to penetrate the soil or otherwise. This will be understood by referring to Fig. 1, in which it will be seen that by depressing or lowering the roller on the bar the mold-board will be less inclined, and consequently, if the draft-chain or whiffletree be properly adjusted at the end of the beam, the point or share will have a greater tendency to penetrate the earth than if the roller were higher up on the bar, the roller always bearing upon the earth. The mold-board B does not cast the earth from either side, as usual; but the earth, in consequence of the recesses *c c*, will pass over the top of the mold-board and drop behind it, so that no furrow will be formed or left behind the mold-board; but the soil will be left in a loose light state, permeable to air and moisture, and all grass, weeds, roots, and the like perfectly cut up. The mold-board by operating in this manner does not of course cast earth, sods, or stones upon the growing plants, as is frequently the case in using the ordinary shovel-plows, which cast the earth from either side of them. This is an important feature of the invention.

The point or share E also, in consequence of being made separate of steel and attached to the mold-board, may be readily detached and sharpened, and when much worn a new one may be attached to the mold-board. The plow is therefore not only rendered far more durable, but it may always be kept in perfect order, for the mold-board will last an indefinite period of time, it not being subjected to much wear, and the plow will always be in order, provided the point or share is kept in proper condition. By my improvement this can be done; but it cannot be done when the mold-board and share are cast in one piece. The ordinary shovel-plows cannot be regulated by the draft-chain so as to regulate the depth of the furrow, for they have no guide, the point or share merely penetrating the soil. The roller F in my improvement diminishes friction and serves as a more perfect guide than the landside of ordinary plows.

Having thus described my invention, I wish it distinctly understood that I do not claim broadly the idea of passing a portion of the earth over the mold-board into the furrow behind, as I am aware that this has before been done; neither do I claim applying a movable mold-board to one of the outer edges of the share, as described in an application of J. Drummond, rejected October 25, 1844; neither do I claim the use of projecting blades at the outer ends of the share, as described in the patent of B. Langdon, granted June 22, 1842, and others; but,

Having thus described my invention, what I claim as new therein, and desire to secure by Letters Patent, is—

1. The inclined shovel mold-board B, formed and mounted substantially as described, and constructed highest at its outer edges, so as to form on each side of the standard A a recess, *c*, through which recesses a portion of the earth may, after rising upon the mold-board, descend into the furrow in the rear of the plow.

2. The combination, with the beam A and mold-board B, of the adjustable wheel F, arranged and operating substantially as and for the purposes specified.

PAUL DENNIS.

Witnesses:
HENRY W. DENNIS,
JOSEPH A. KING.